UNITED STATES PATENT OFFICE.

HARRY CROSS HUBBELL, OF IRVINGTON, NEW JERSEY, ASSIGNOR TO HUBBELL-FULLER BATTERY COMPANY, A CORPORATION OF NEW JERSEY.

STORAGE-BATTERY ELECTRODE AND PROCESS OF MAKING SAME.

1,373,733. Specification of Letters Patent. Patented Apr. 5, 1921.

No Drawing. Application filed July 9, 1915, Serial No. 38,902. Renewed August 13, 1920. Serial No. 403,301.

*To all whom it may concern:*

Be it known that I, HARRY CROSS HUBBELL, a citizen of the United States, residing at Irvington, in the county of Essex and State of New Jersey, have invented certain new and useful Improvements in Storage-Battery Electrodes and Processes of Making Same, of which the following is a specification.

My present invention is an improved negative plate or electrode for an alkaline storage battery; and process of making same.

The preferred plate and the preferred process is as follows: I take for active materials the following:—Two parts by weight of fine metallic cadmium (obtained by reducing the sulfate with metallic zinc) and one part of anhydrous nickel sesquioxid, $Ni_2O_3$. These materials are mixed and formed under heavy pressure into small tablets about $\frac{1}{2}''x\frac{3}{4}''x\frac{3}{32}''$. The tablets are then gradually heated in a covered iron cylinder or flask out of contact with the air up to a dull red heat in order to cause a reaction between the finely divided metallic cadmium and the nickel oxid. The probable result is that the tablets now consist of metallic nickel and more or less cadmium oxid and metallic cadmium. The tablets before heating should not be exposed to the air, as slow oxidation of the cadmium without reduction of the nickel oxid will take place.

A number of the tablets treated as aforesaid are assembled between thoroughly perforated or slotted iron sheets about .004" to .005" thick and united by a few rivets, said sheets being crimped where their edges come together and a terminal lug being attached to produce a negative electrode for use in an alkaline storage battery.

As a modification of the process, I may place the tablets before heating between the thin iron sheets and then pierce the iron with holes resembling those of a nutmeg grater so that the burs extend into the tablets. I then heat the entire plate to bring about the described reaction. This has the advantage of considerably reducing the weight and size of the plate and makes the use of rivets unnecessary.

The reaction between the cadmium and the nickel oxid seems to result in a very intimate relation between the active materials. The plate does not cement or become non-porous, as is the case where nothing but powdered cadmium is used. The nickel also seems to act as a catalytic agent making the cadmium more freely oxidized on discharge. Further, the tablets are very strong and, in spite of use under exaggerated current density conditions, do not disintegrate or deteriorate.

I prefer to make the powdered cadmium as follows: I precipitate it by metallic zinc from a dilute solution of cadmium sulfate or chlorid, preferably the sulfate. The resulting sponge or powdered cadmium is then washed off the zinc and dried at a low temperature so as to prevent atmospheric oxidation, or better still in a vacuum or inert atmosphere.

Instead of $Ni_2O_3$, I may in general use some other oxygen compound, for example $NiO$, or a hydrate or hydrated oxid, including the same compounds of cobalt.

What I claim is:

1. The process which comprises heating a nickel oxid with finely divided cadmium.

2. The process which comprises tableting a nickel oxid with finely divided cadmium and heating the tablets in a substantially non-oxidizing atmosphere to bring about a reaction between said materials.

3. The process which comprises tableting a nickel oxid with finely divided cadmium, assembling the tablets in a perforated metal container for an electrode, and heating the tablets and the container in a substantially non-ozinizing atmosphere to bring about a reaction between the tableted materials.

4. The process which comprises tableting a nickel oxid with finely divided cadmium, assembling the tablets in a perforated metal container for an electrode, piercing the sides of the container with holes so that the burs extend into the tablets, and heating the tablets and the container in a substantially non-oxidizing atmosphere to bring about a reaction between the tableted materials.

5. The process which comprises heating nickel sesquioxid with finely divided cadmium.

6. The process which comprises heating anhydrous nickel sesquioxid with finely divided cadmium.

In testimony whereof I affix my signature.

HARRY CROSS HUBBELL.